United States Patent
Weng et al.

(10) Patent No.: US 7,327,134 B1
(45) Date of Patent: Feb. 5, 2008

(54) METHOD AND SYSTEM FOR TRANSFORMER CONTROL

(75) Inventors: Haiqing Weng, Shanghai (CN); Kunlun Chen, Shanghai (CN); Rajib Datta, Niskayuna, NY (US); Allen Michael Ritter, Roanoke, VA (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/460,064

(22) Filed: Jul. 26, 2006

(51) Int. Cl.
*G01R 15/18* (2006.01)

(52) U.S. Cl. .................................................. 324/127

(58) Field of Classification Search ............. 324/158.1, 324/765, 117 R, 117 H, 127, 772, 547; 363/37.98, 363/65.39, 171, 153; 318/805, 138, 803, 318/808
See application file for complete search history.

(56) References Cited

U.S. PATENT DOCUMENTS

| 4,879,639 A | * | 11/1989 | Tsukahara | .................... 363/37 |
| 5,661,390 A | * | 8/1997 | Lipo et al. | .................. 318/803 |
| 6,330,170 B1 | * | 12/2001 | Wang et al. | ................... 363/37 |
| 6,439,347 B2 | * | 8/2002 | Suga et al. | ................. 187/290 |

* cited by examiner

*Primary Examiner*—Ha Tran Nguyen
*Assistant Examiner*—Tung X. Nguyen
(74) *Attorney, Agent, or Firm*—Ann M. Agosti; Patrick K. Patnode

(57) ABSTRACT

A method to balance transformer flux among a plurality of transformers is disclosed. The plurality of transformers is connected to a plurality of converters, each transformer having an associated converter. The method comprises determining a reference flux value, measuring an actual flux value for each transformer, and developing a plurality of voltage command signals in relation to a plurality of variance values between the reference flux value and each actual flux value. In response to the voltage command signals being received at a modulator in signal communication with the plurality of converters, the method proceeds by generating a plurality of switching signals to reduce each of the variance values by making available the plurality of switching signals to each of the associated plurality of converters.

21 Claims, 6 Drawing Sheets

METHOD AND SYSTEM FOR TRANSFORMER CONTROL

BACKGROUND OF THE INVENTION

The present disclosure relates generally to power conversion, and particularly to transformer control.

Transformers are used to convert between high and low voltages, to change impedance, and to provide electrical isolation between circuits. In a transformer, an alternating current in one winding creates a time-varying magnetic flux in the core, which induces a voltage in the other windings. A group of transformers may be connected together to provide specific operating characteristics.

Imbalance of transformer flux among the group of transformers may result in the generation of a flux direct current (DC) offset. In a perfect environment, it is preferable that transformers not be driven with DC nor, generally, have any DC component present at the input. Relatively small amounts of DC can cause core saturation, current distortion, and increased losses, thereby preventing proper operation. Also, because a DC voltage source does not provide a time-varying flux in the core, an induced counter-EMF is not generated, resulting in current flow into the transformer that is limited only by the series resistance of the transformer windings. In this situation, the transformer would heat until it either reaches thermal equilibrium or is possibly damaged.

One cause of core saturation is the accumulation of low frequency flux, such as when a motor is starting, for example. Another cause of flux saturation within series connected transformers is flux imbalance among the different transformers, which may result from disturbances within the grid and variation among transformer parameters or switching patterns. Flux balance control is generally implemented by controlling the average value of transformer flux to be zero. This will involve the moving-average calculation of flux. However, during very low frequency operation, such as motor startup, the delay caused by the average flux calculation is too large, making it difficult to control the flux balance within an acceptable period. Accordingly, there is a need in the art for a transformer arrangement that overcomes these drawbacks.

BRIEF DESCRIPTION OF THE INVENTION

An embodiment of the invention includes a method to balance transformer flux among a plurality of transformers. The plurality of transformers is connected to a plurality of converters, each transformer having an associated converter. The method comprises determining a reference flux value, measuring an actual flux value for each transformer, and developing a plurality of voltage command signals in relation to a plurality of variance values between the reference flux value and each actual flux value. In response to the voltage command signals being received at a modulator in signal communication with the plurality of converters, the method proceeds by generating a plurality of switching signals to reduce each of the variance values by making available the plurality of switching signals to each of the associated plurality of converters.

Another embodiment of the invention includes a control system to balance transformer flux among a plurality of transformers connected to a plurality of converters. The system includes a flux estimator configured to estimate a reference flux value, and a plurality of flux monitors in signal communication with each transformer, each flux monitor configured to measure an actual flux value of each transformer. A plurality of flux comparators is in signal communication with the flux estimator and each flux monitor, the plurality of flux comparators configured to determine a plurality of variance values between the reference flux value and each actual flux value. A plurality of flux regulators is in signal communication with each of the flux comparators, the plurality of flux regulators configured to develop a plurality of voltage command signal responsive to each variance value. A modulator is in signal communication with the plurality of flux regulators and the plurality of converters, the modulator responsive to each voltage command signal and configured to generate and make available a switching signal to each converter, wherein the switching signal is configured to reduce each variance value.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a method to control the flux balance of series connected transformers that are controlled by power electronic converters. The method will mitigate the flux DC offset to avoid transformer saturation at both low and high frequency operation.

An embodiment of the invention will also reduce unnecessary current stress when the output voltage is to be delivered through transformers and the net voltage requires to be minimally affected by the transformer magnetizing current. In an embodiment, an instantaneous reference flux value is determined from a motor flux (or a grid voltage that is connected to the transformers), and is compared with the instantaneous actual flux of each transformer. A regulator output is sent to a modulator, together with a normal current regulator output, to directly control the instantaneous flux for each transformer.

To balance flux among transformers associated with the grid, the goal is to evenly distribute the supply voltage to avoid any flux DC offset of any one of the transformers. To balance flux among transformers associated with a drive, such as a motor for example, the motor stator flux is evenly distributed among the transformers. Or, if there is at least one converter configured to feed directly to the motor without a transformer, performance can be enhanced if this converter supports the IR (current times resistance) drop of the motor.

In an embodiment, a regulator, such as a proportional-integral controller, for example, provides a signal to a converter modulator, which is used to control the transformer instantaneous flux in a static reference frame, such as an alpha-beta two-phase representation, or an ABC three-phase, for example, to the reference value. Because the bandwidth of the regulator is independent of the electrical frequency of motor and the grid, it is suitable for control of the variable frequency motor, and therefore allows transformer flux to be balanced at low frequency operation, such as during motor ramp up to nominal speed.

Figure 1:
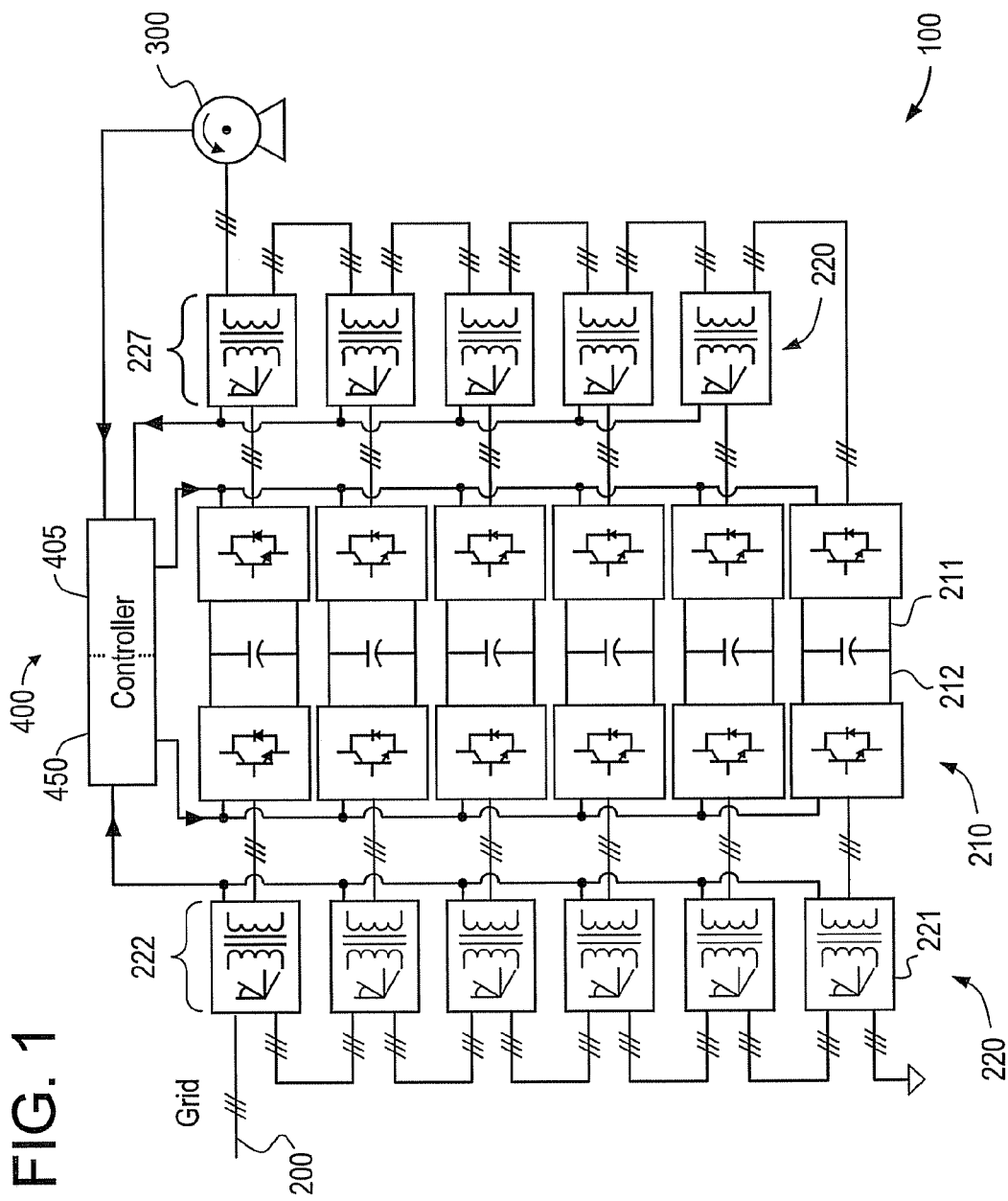
FIG. 1 depicts a block schematic diagram of a motor drive system utilizing a flux balance controller in accordance with an embodiment of the invention.

Referring now to FIG. 1, an embodiment of a motor drive system 100 is depicted. The motor drive system 100 connects to a grid (labeled "Grid") 200, and comprises a load (also herein referred to as a motor) 300, a plurality of converters 210, a plurality of transformers 220, and a flux balance controller 400. Reference numerals 211 and 221 will be used herein to refer, respectively, in general, to a single converter of the plurality of converters 210, and a single transformer of the plurality of transformers 220. In an embodiment, the plurality of transformers 220 consists of a first set of transformers 227 associated with the motor 300, and a second set of transformers 222 associated with the grid 200.

In an embodiment, the first set of transformers 227, associated with the motor 300, are connected in series, and the second set of transformers 222, associated with the grid 200, are connected in series. In an embodiment, the transformers 220 are three phase transformers. In an embodiment, the flux balance controller 400 is in signal connection with each transformer 221, each converter 211, and the motor 300. It will be appreciated that for the purposes of clarity of illustration, the flux balance controller 400 may be considered to comprise a motor-side transformer flux controller 405, and a grid-side transformer flux controller 450, as will be described further below.

Figure 2:
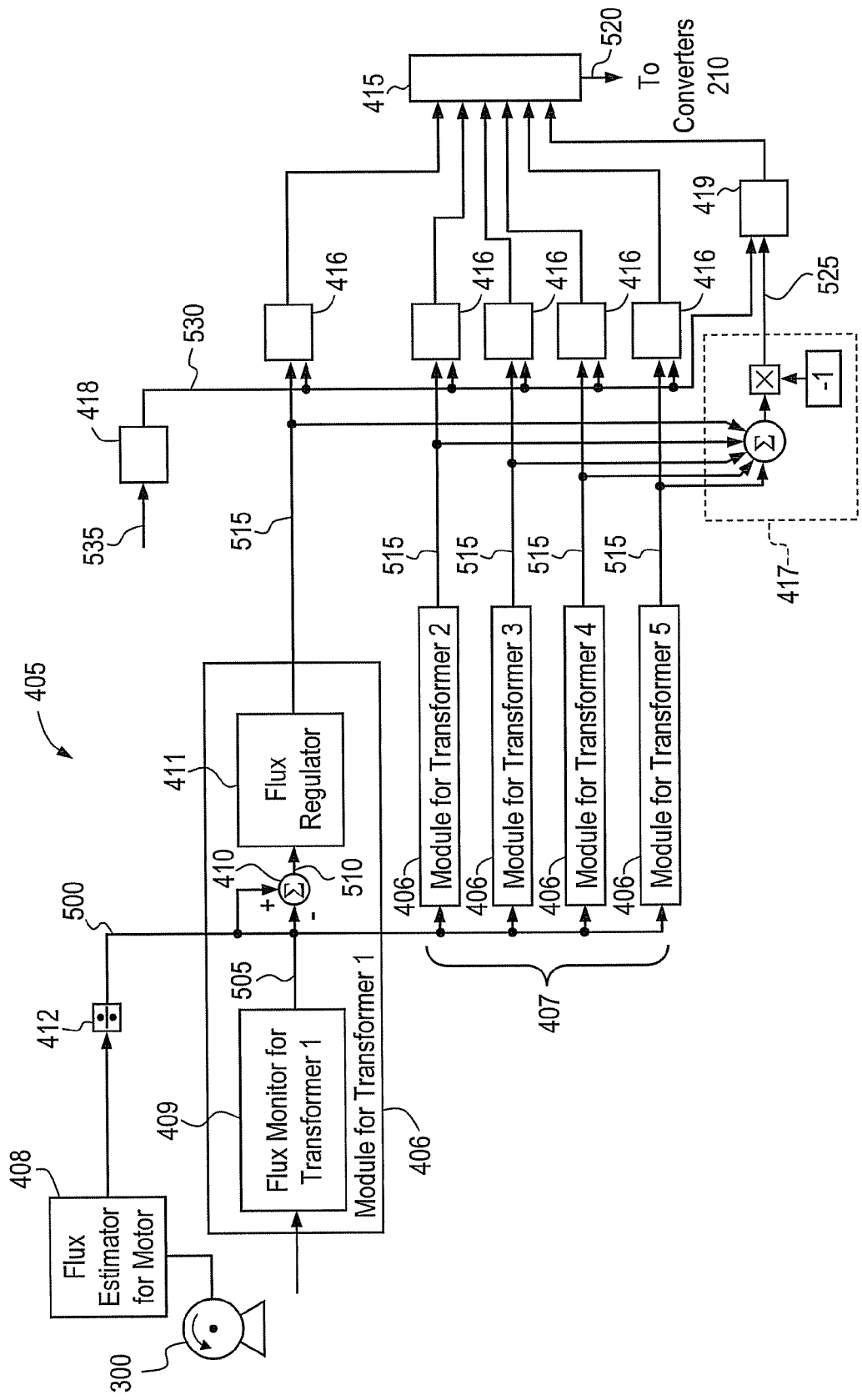
FIG. 2 depicts a block schematic diagram of a motor-side transformer flux controller in accordance with an embodiment of the invention.

Referring now to FIG. 2, an exemplary embodiment of the motor-side transformer flux controller 405 for controlling the flux associated with the first set of transformers 227 associated with the motor 300 is depicted. A module 406, associated with one of the transformers 221 of the first set of transformers 227 is depicted in enlarged view. It will be appreciated that each module 406 of a set 407 of modules 406 includes similar components as described below.

In an embodiment, the controller 405 comprises a flux estimator 408 configured to determine a reference flux value 500, a plurality of flux monitors 409, a plurality of flux comparators 410, a plurality of flux regulators 411, and a modulator 415. In an embodiment, the flux estimator 408 is configured to provide an instantaneous, real-time reference flux value 500.

While an embodiment of the invention has been described having a flux estimator to determine the reference flux value, it will be appreciated that the scope of the invention is not so limited, and that the invention also applies to control systems using other means to provide the reference flux value in addition to estimating, such as measuring, calculating, and interpolating, for example.

In an embodiment, each flux monitor 409 is in signal communication with each transformer 221, and the plurality of flux monitors 409 is configured to measure an actual flux value 505 of each transformer 221. Each comparator 410 is in signal communication with the flux estimator 408 and each of the plurality of flux monitors 409. The plurality of flux comparators 410 is configured to determine a plurality of variance values 510 between the reference flux value 500 estimated by the flux estimator 408 and each actual flux value 505 measured by each flux monitor 409. Each regulator 411 is in signal communication with each of the flux comparators 410, each flux regulator 411 configured to develop a plurality of voltage command signals 515 responsive to each variance value 510 provided by each flux comparator 410. In an embodiment, the modulator 415 is in signal communication with the plurality of flux regulators 411 via a plurality of signal conditioners 416, and the plurality of converters 210. The modulator 415 is responsive to each voltage command signal 515, and configured to generate and make available a sinusoidal switching signal 520 to each converter 211, the switching signal 520 configured to reduce each variance value 510 provided by the flux comparator 410.

In an embodiment, the motor 300 is a permanent magnet motor 300. In an embodiment, the flux estimator 408 associated with the motor-side transformer flux controller 405 is configured to determine the reference flux value 500 by relating a determined flux value for the permanent magnet motor 300 with the number of converters 210, as will be described further below. In an embodiment, each of the flux monitors 409 is configured to measure the actual flux value 505 of each transformer 221 of the first set of transformers 227. In an embodiment, each flux comparator 409 is configured to determine the set of variance values 510 as the difference between the reference flux value 500 and each actual flux value 505 of each transformer 221 of the first set of transformers 227. Each of the flux regulators 411 is configured to develop a set of voltage command signals 515 responsive to each variance value 510 associated with each transformer 221 of the first set of transformers 227.

In an embodiment, the controller 405 further comprises a voltage command signal generator 417 in signal communication with each of the flux regulators 411 via each module 406, and the modulator 415 via a signal conditioner 419. In an embodiment, the voltage command signal generator 417 is configured to create an additional voltage command signal 525 in response to the voltage command signals 515 developed by the plurality of flux regulators 411. In an embodiment, the voltage command signal generator 417 is configured to create the additional voltage command 525 signal equal to the inverse of the sum of the voltage command signals 515 developed by each flux regulator 411.

In an embodiment, the controller 405 includes at least one current regulator 418 in signal communication with the modulator 415 via the signal conditioners 416. The at least one current regulator 418 is configured to generate a voltage command signal 530 responsive to current flow in the system 100. In an embodiment, the system 100 includes two current regulators 418, to measure current in the rotating reference frame, known as "x current" and "y current" in the art.

In an embodiment, each current regulator 418 receives as inputs 535 current commands and current feedbacks. In an embodiment, the current commands originate from the user, or some other regulators, such as a speed regulator, for example. In an embodiment, the current feedback originates from a current sensor in the system 100, and undergoes a 3-phase to 2-phase transformation before being sent to the current regulator 418.

Referring back now to FIG. 1, at zero to low frequency, AC current behaves very similar to DC current. In response to very low frequency AC current, the transformers 221 will act primarily as a resistive load, as determined by the resistance of the coil windings, without any substantial inductive load. It is this IR (current times resistance) drop that causes the DC offset voltage. In an embodiment, the start phase of the motor 300, which includes low frequency operation, will be handled exclusively by the one converter 212, described below as the Nth converter 212, to which a coupling transformer 221 is not connected. In this way, the IR drop, which causes the DC offset voltage, will not be routed through any of a set of primaries of the first set of transformers 227. In response to the increase of frequency (to increase motor speed) the relative magnitude of inductive counter-EMF provided by transformers in response to AC current will begin to overtake the IR drop (DC offset voltage). As this frequency increases, (and the relative magnitude of the DC offset voltage decreases) the flux balance controller 400 will cause the converters 210 to supply current to the first set of transformers 227 to power the motor 300.

While an embodiment has been described as having a total of 6 converters in conjunction with 6 transformers associated with the grid and 5 transformers associated with the motor, it will be appreciated that the scope of the invention is not so limited, and that the invention will also apply to other converter/transformer arrangements, such as a total of 3 converters in conjunction with 3 transformers associated with the grid and 2 transformers associated with the motor for example, or any other converter/transformer topology controlled to reduce the imbalance of transformer flux.

With reference now to FIGS. 1 and 2, in an embodiment, a summation of stator flux of the motor 300 and an IR drop of the motor 300 is divided within a divisor block 412 by N (the number of converters 210) to form the reference flux value 500 for each converter 211. There are in total N−1 transformers 221, modules 406, and flux regulators 411 associated with the motor 300. The voltage command signal 515 output from each regulator 411 can be regarded as a DC type offset voltage, which is then added to the output 530 of the current regulator 418. Because the summation of the offset voltage 515 of the N converters 210 should be zero, the voltage offset 525 of the Nth converter 212 is set to the negative of the output summation of the other N−1 converters 210.

Simulations with a 36-pulse system were conducted to verify the disclosed method. Three scenarios related to the motor 300 starting sequence are described below. The simulation covered the time corresponding to the motor 300 starting from a frequency of 0 Hz and increasing up to 0.5 Hz, with an active current command set to 400 A. In scenario 1, each converter 211 shares the same voltage reference 530 from the current regulator 418, without the described control. In scenario 2, the Nth converter 212, (without a coupling transformer 221) supports the IR drop and ⅙ of the remaining voltage, but without the described control. In scenario 3, each converter 211 shares the same flux and IR drop with the described closed loop control implemented. Although scenario 2 has been found to have better performance than scenario 1, the first transformer flux is found to exceed it's rated value, which is around 0.2 weber (Wb), in both scenarios. In scenario 3, the feedback control described above succeeds in maintaining proper flux levels throughout the starting sequence of the motor 300.

Another set of simulations, related to high-speed operation, has been conducted. In this set of simulations, a 0.2 Wb disturbance is set to a second converter of the plurality of converters 210 at time 0.2 and the flux balance control starts at time 0.4. It has been found that within 200 ms, the flux of the associated second transformer is quickly restored to zero.

Figure 3:
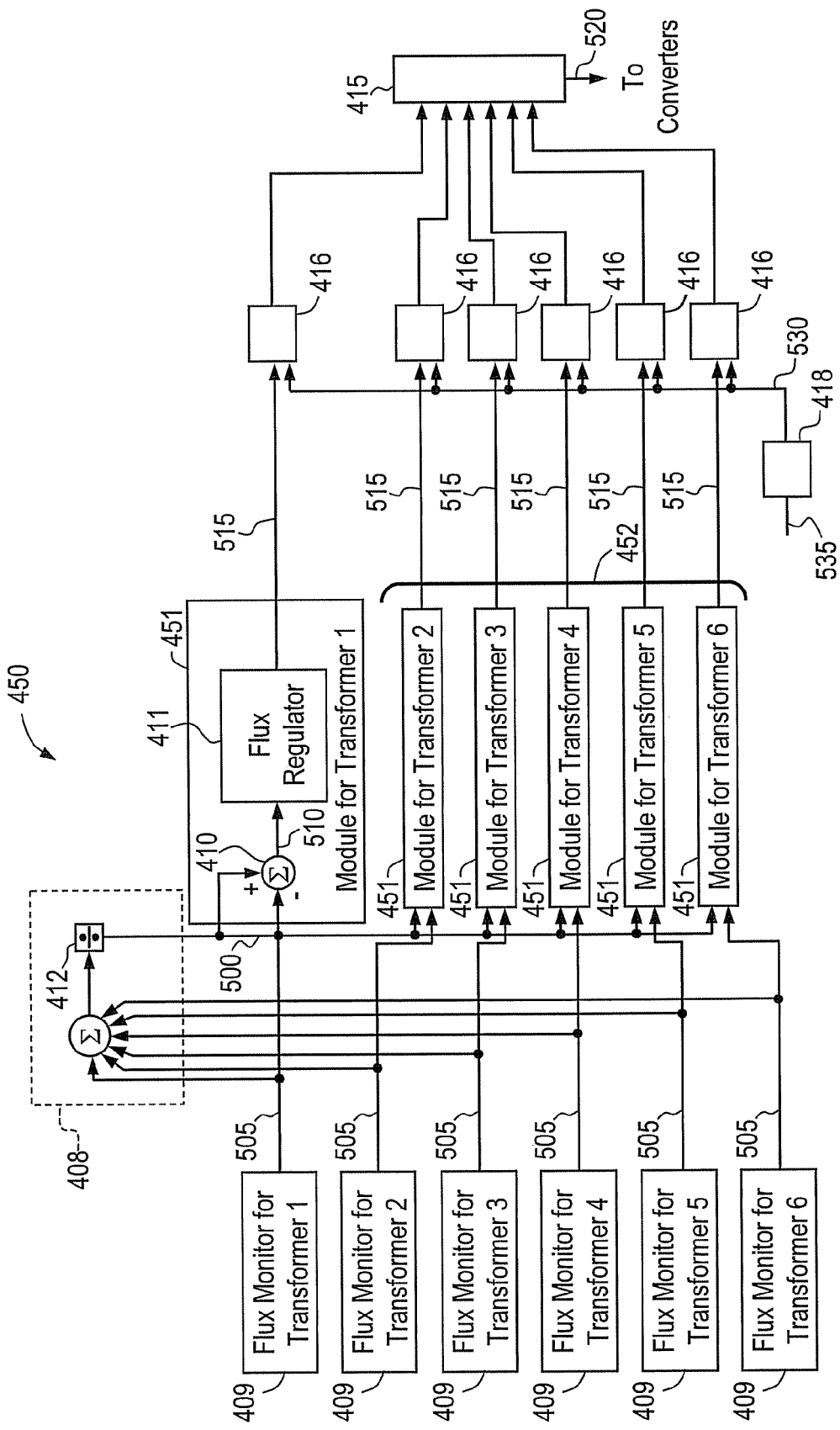
FIG. 3 depicts a block schematic diagram of a grid-side transformer flux controller in accordance with an embodiment of the invention.

Referring now to FIG. 3, an exemplary embodiment of the of the grid-side transformer flux controller 450 for controlling the flux associated with the second set of transformers 222 associated with the grid 200 is depicted. A module 451, associated with one of the transformers 221 of the second set 222 of transformers is depicted in enlarged view. It will be appreciated that each module 451 of a set 452 of modules 451 includes similar components.

In an embodiment, it will be appreciated that the grid-side transformer flux controller 450 operates in substantially the same manner as the motor-side transformer flux controller 405 described above, and that like components have been numbered alike. Accordingly, only the differences in operation will be described below.

In an embodiment, each flux monitor 409 is configured to measure the actual flux value 505 of each transformer 221 of the second set of transformers 222. In an embodiment, the flux estimator 408 is configured to determine the reference flux value 500 as an average of the actual flux values 505 measured by each of the flux monitors 409. In an embodiment, each flux comparator 410 is configured to determine the variance value 510 as the difference of the reference flux value 500 and each actual flux value 505 of each transformer of the second set 222 of transformers. In an embodiment, each flux regulator 411 is configured to develop the set of voltage command signals 515 responsive to each variance value 510 associated with each transformer 221 of the second set of transformers 222.

Referring back now to FIG. 1, it will be appreciated that in an embodiment, the second set of transformers 222 includes as many transformers 221 as converters 211, and that the first set of transformers 227 includes one less transformer 221 than converters 211. Accordingly, the grid-side transformer flux controller 450 depicted in FIG. 3 does not comprise the additional voltage command signal generator 417 as described above with reference to the motor-side transformer flux controller 405 depicted in FIG. 2.

Figure 4:
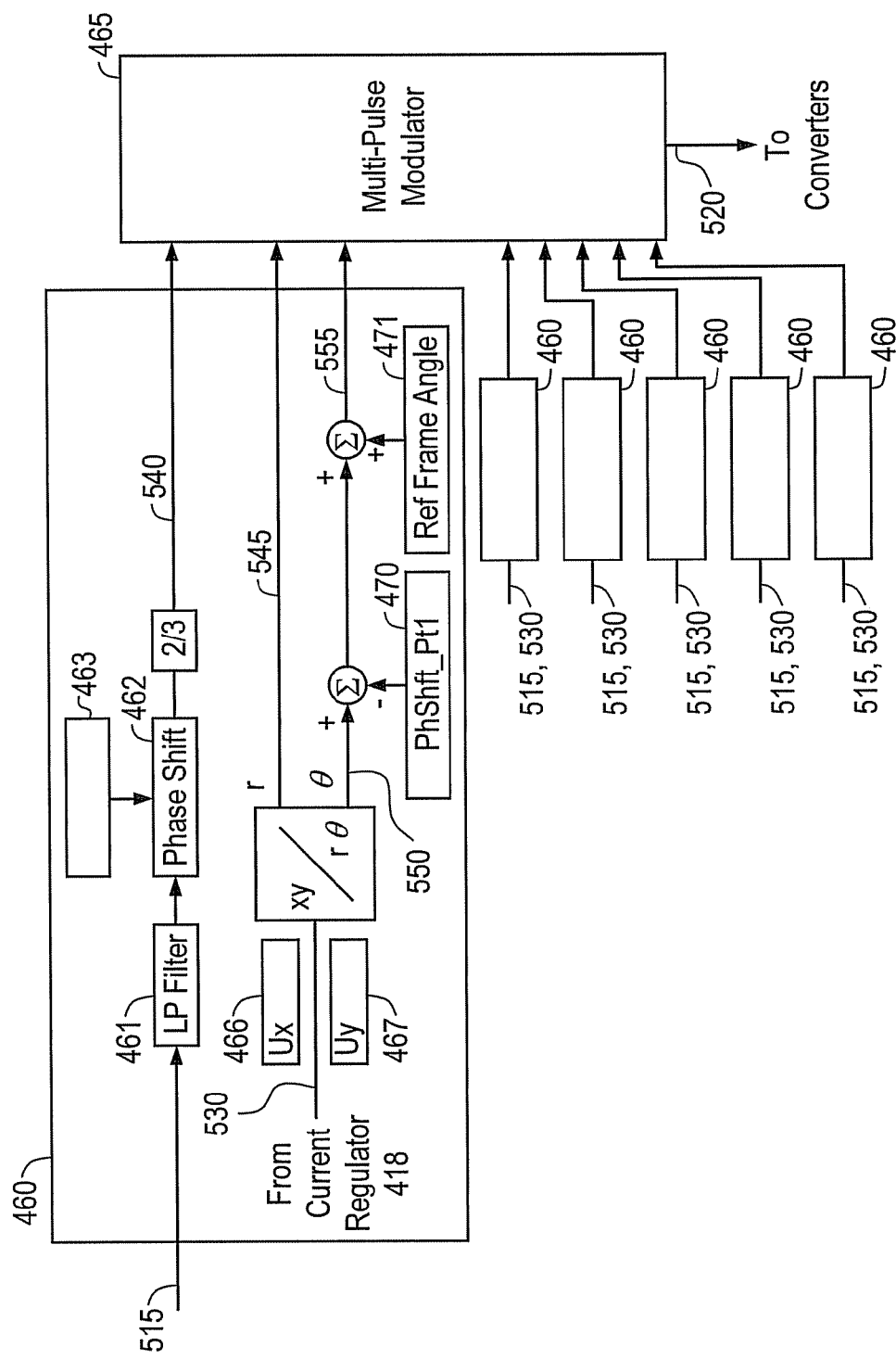
FIG. 4 depicts a block schematic diagram of a signal conditioner in conjunction with a multi-pulse modulator in accordance with an embodiment of the invention.

Referring now to FIG. 4, an exemplary embodiment of a multi-pulse modulator 465 is depicted. An enlarged view of an exemplary signal conditioner 460 configured for operation with the multi-pulse modulator is also depicted. It will be appreciated that each of the signal conditioners 460, corresponding to each of the plurality of converters 210 depicted in FIG. 1, is in signal communication with the multi pulse modulator 465 and comprises similar components to those depicted in the enlarged view.

In an embodiment, each voltage command signal 515 provided by the Flux Regulator 411 (depicted in FIGS. 2 and 3) is one of the inputs to the signal conditioner 460. Each voltage command signal 515 will pass through a low pass filter 461. Subsequent to the filter 461, each voltage command signal 515 will be shifted by a phase shifter 462 by an amount corresponding to a phase shift angle 463 of the associated transformer 221. In an embodiment, each of the plurality of transformers 220 may be phase-shifted transformers 221. Accordingly, the voltage command 515 should be shifted before being sent to the modulator 465. Subsequent to the phase shift, the voltage command signal 515 is transformed from a two-phase Alpha/Beta representation of three-phase to an ABC three-phase signal, and provided to the modulator 465 as a voltage DC offset command 540.

In an embodiment, an Ux command 466 and an Uy command 467 are provided by the current regulator 418, and are transformed to magnitude 545 and angle 550 through the transformation xy/rθ, where r is the magnitude 545 of the voltage command, and θ is the angle 550 of the voltage command in a rotating reference frame (wherein the current regulator is calculated). The magnitude (r) 545 is then sent to the modulator 465 as a voltage magnitude command 545. The angle (θ) 550 is summed with a phase shift angle of the transformer 470 (PhShft_Pt1), and an angle of the rotating reference frame 471 (Ref Frame Angle), and then sent to the modulator 465 as a voltage phase angle command 555.

Figure 5:
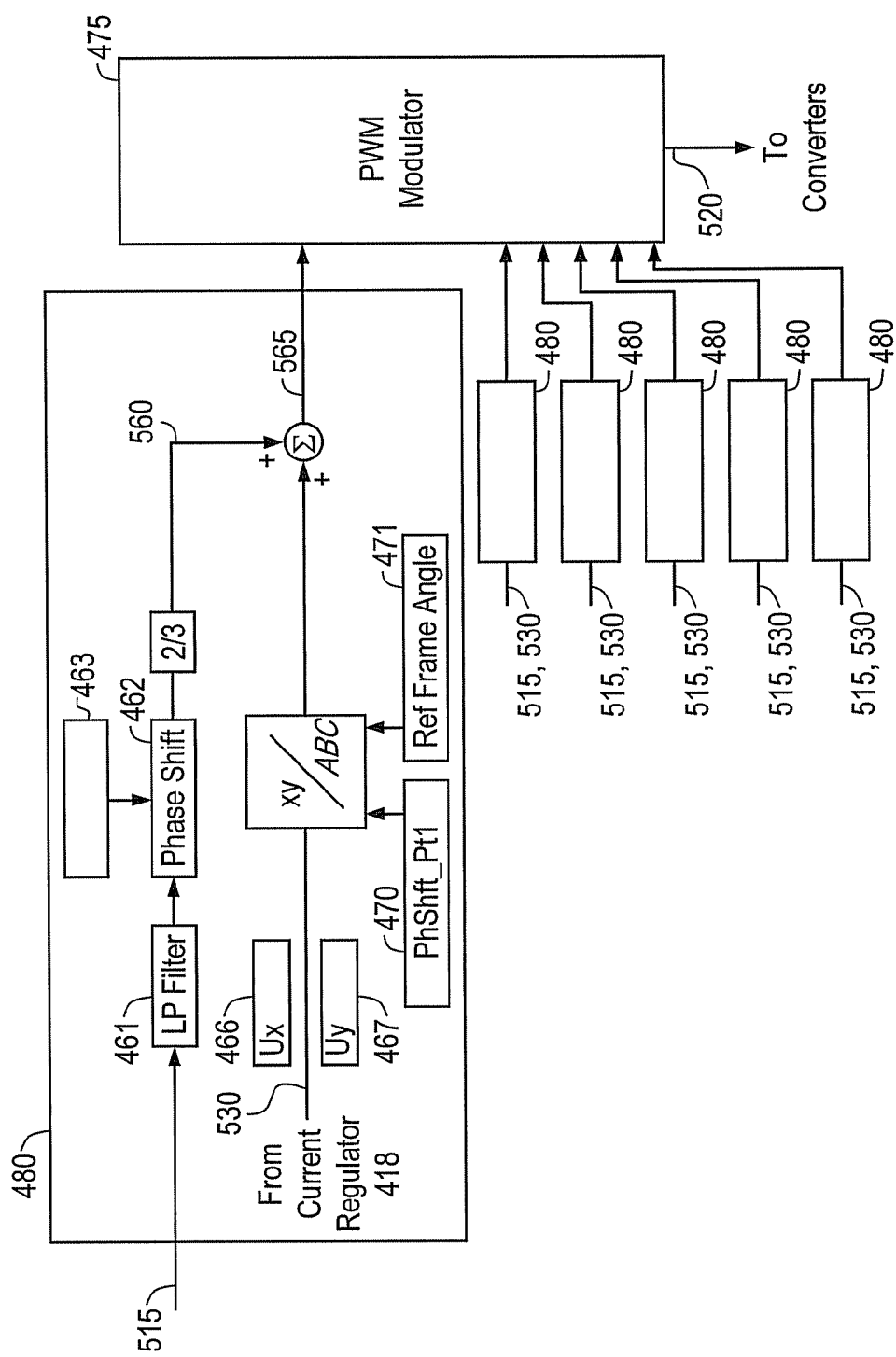
FIG. 5 depicts a block schematic diagram of a signal conditioner in conjunction with a pulse-width-modulation modulator in accordance with an embodiment of the invention.

Referring now to FIG. 5, an exemplary embodiment of a pulse width modulator 475 is depicted. An enlarged view of an exemplary signal conditioner 480 configured for operation with the pulse width modulator 475 is also depicted. It will be appreciated that each of the signal conditioners 480, corresponding to each of the plurality of converters 210 depicted in FIG. 1, is in signal communication with the multi pulse modulator 475 and comprises similar components to those depicted in the enlarged view.

In an embodiment, each voltage command signal 515 provided by the Flux Regulator 411 is one of the inputs to the signal conditioner 480. Each voltage command signal 515 will pass through the low pass filter 461. Subsequent to the filter 461, each voltage command signal 515 will be shifted by the phase shifter 462 an amount corresponding to the phase shift angle 463 of the associated transformer 221. In an embodiment, each transformer 221 of the plurality of transformers 220 may be phase-shifted transformers 221. Accordingly, the voltage command signal 515 should be phase-shifted before being sent to the modulator 475. Subsequent to the phase shift, the voltage command signal 515 is transformed from a two-phase Alpha/Beta representation to a three-phase signal 560.

In an embodiment, the Ux command 466 and the Uy command 467 are provided by the current regulator 418. They will be shifted by the associated transformer phase shift angle 470 (PhShft_Pt1), and the angle of the rotating reference frame 471 (Ref Frame Angle). Subsequent to the phase shift, the Ux and Uy commands 466, 467 are transformed from a two-phase Alpha/Beta representation to a three-phase signal, implemented by an XY/ABC transformation, which is known in the art. The output is summed with the three-phase signal 560 and is sent to the modulator 475 as a voltage command 565.

Figure 6:
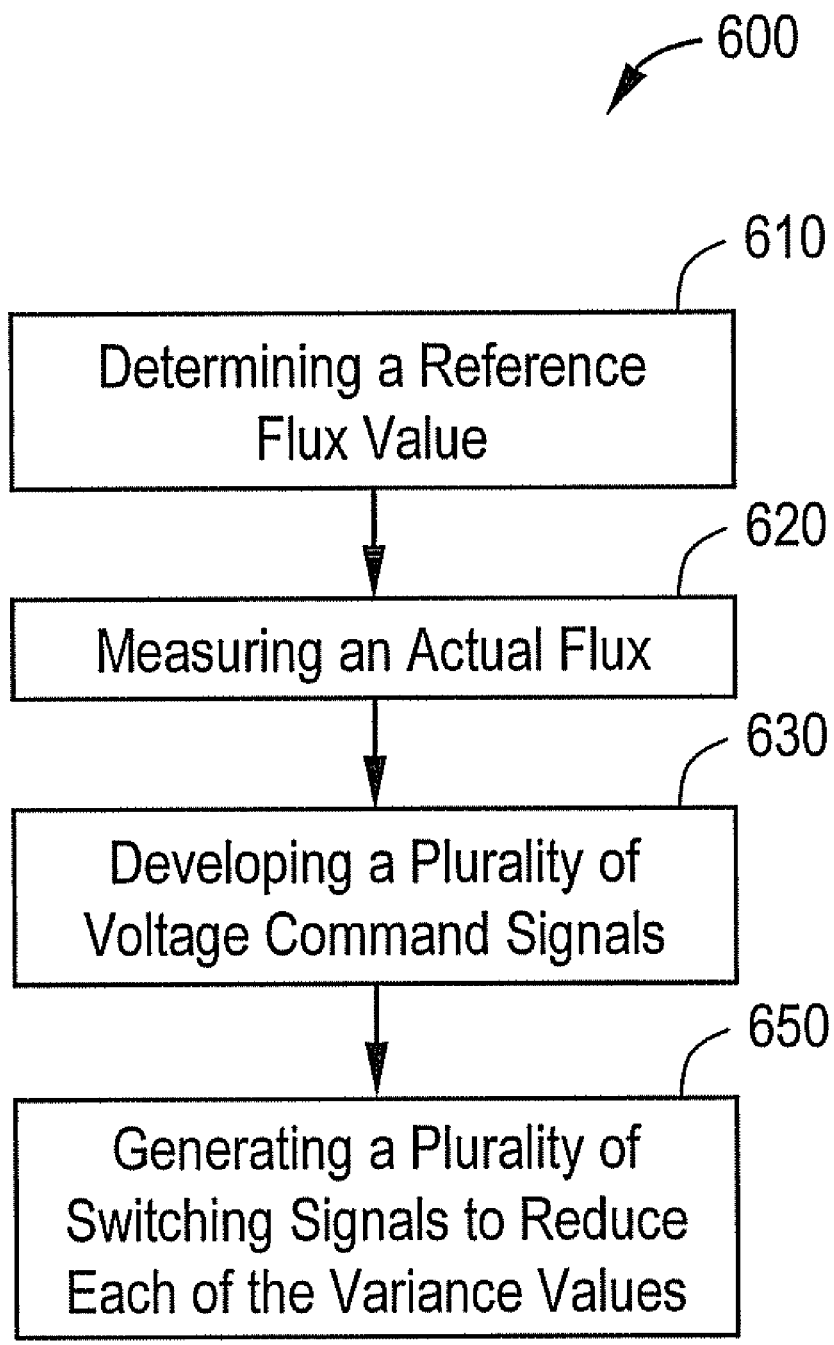
FIG. 6 depicts a flowchart of an exemplary method to balance flux among a set of transformers in accordance with an embodiment of the invention.

Referring now to FIG. 6, in conjunction with FIGS. 1 through 3, a flowchart 600 of an exemplary embodiment of a method to balance transformer flux of the plurality of transformers 220 connected to the plurality of converters 210, as performed by the control system 400 is depicted. The method begins with determining 610 the reference flux value 500. Next, the method continues with measuring 620 the actual flux value 505 for each transformer 221 of the plurality of transformers 220. Measurement 620 of the actual flux value 505 is followed by developing 630 a plurality of voltage command signals 515 in relation to the plurality of variance values 510, as determined by the plurality of flux comparators 410, between the reference flux value 500 and each actual flux value 505.

In response to the voltage command signals 515 being received, via the plurality of signal conditioners 416, at the modulator 415 in signal communication with the plurality of converters 211, generating 650 a plurality of switching signals 520 to reduce each of the variance values 510 by making available the plurality of switching signals 520 to each of the associated plurality of converters 210.

In an embodiment, the determining 610 the reference flux value 500 comprises determining an instantaneous, real-time reference flux value 500. In an embodiment, the determining 610 the reference flux value 500 comprises determining a total flux value, and dividing the total flux value by the number of converters 211, thereby providing the reference flux value 500.

In an embodiment, the developing 630 the plurality of voltage command signals 515 comprises subtracting the reference flux value 500 from the actual flux value 505 at each flux comparator 410 for each transformer 221, thereby determining the variance value 510 for each transformer 221, and translating the variance value 510 for each transformer 221 via each flux regulator 411, thereby developing the voltage command signal 515. In an embodiment, the translating the variance value 510 into the voltage command signal 515 comprises a closed-loop proportional-integral calculation. In an embodiment, the generating 650 a plurality of switching signals 520 further comprises voltage command signals 515 being received, via the plurality of signal conditioners 416, at the modulator 415 from at least one current regulator 418.

While an embodiment has been described using a closed-loop proportional integral calculation, it will be appreciated that the scope of the invention is not so limited, and that the invention will also apply to other control system methods, such as a proportional-integral-derivative method, or other appropriate control system methods, for example.

In an embodiment, wherein the first set 227 of the plurality of transformers 220 is associated with the permanent magnet motor 300, the determining 610 the reference flux value 500 comprises relating an determined flux value for the permanent magnet motor 300 with the number of converters 210. Additionally, the measuring 620 the actual flux value 505 comprises measuring the actual flux value 505 for each transformer 221 of the first set of transformers 227, and, the developing 630 the plurality of voltage command signals 515 comprises developing the set of voltage command signals 515 related to each transformer 221 of the first set of transformers 227 associated with the permanent magnet motor 300.

In an embodiment, wherein the first set 227 of the plurality of transformers 220 is associated with the permanent magnet motor 300, the method further comprises creating the additional voltage command signal 525 by combining the set of developed voltage command signals 515 at the signal generator 417 and making available the additional voltage command signal 525 to the modulator 415 via the signal conditioner 416. In an embodiment, the creating the additional voltage command signal 525 at the signal generator 417 comprises summing the set of developed voltage command signals 515, thereby creating a summed voltage command signal; and inverting the sign of the summed voltage command signal, thereby creating the additional voltage command signal 525.

In an embodiment, wherein the second set 222 of the plurality of transformers 220 is associated with the grid 200, the determining 610 the reference flux value 500 comprises combining the actual flux values 505 for each transformer 221 of the second set of transformers 222. Additionally, the measuring 620 the actual flux value 505 comprises measuring the actual flux value 505 for each transformer 221 of the second set of transformers 222, and, the developing 630 the plurality of voltage command signals 515 comprises developing the set of voltage command signals 515 related to each transformer 221 of the second set of transformers 222.

As disclosed, some embodiments of the invention may include some of the following advantages: the ability to balance flux among series connected transformers to reduce DC offset voltage; the ability to avoid transformer core saturation; and the ability to increase transformer efficiency by reduction of DC offset voltage.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method to balance transformer flux of a plurality of transformers connected to a plurality of converters, each transformer having an associated converter, the method comprising:
   determining a reference flux value;
   measuring an actual flux value for each transformer;
   developing a plurality of voltage command signals in relation to a plurality of variance values between the reference flux value and each actual flux value; and
   in response to the voltage command signals being received at a modulator in signal communication with the plurality of converters, generating a plurality of switching signals to reduce each of the variance values by making available the plurality of switching signals to each of the associated plurality of converters.

2. The method of claim 1, wherein the determining the reference flux value comprises:
   determining an instantaneous, real-time reference flux value.

3. The method of claim 1, wherein the determining the reference flux value comprises:
   determining a total flux value; and
   dividing the total flux value by the number of converters, thereby providing the reference flux value.

4. The method of claim 1, wherein the developing comprises:
   subtracting the reference flux value from the actual flux value for each transformer, thereby determining the variance value for each transformer; and
   translating the variance value for each transformer via a flux regulator, thereby developing the voltage command signal.

5. The method of claim 4, wherein the translating comprises:
   a closed-loop proportional/integral calculation.

6. The method of claim 1, wherein the generating a plurality of switching signals further comprises:
   voltage command signals being received at the modulator from at least one current regulator.

7. The method of claim 1, wherein a set of the plurality of transformers is associated with a permanent magnet motor, wherein:
   the determining the reference flux value comprises relating a determined flux value for the permanent magnet motor with the number of converters;
   the measuring the actual flux value comprises measuring the actual flux value for each of the set of transformers; and
   the developing the plurality of voltage command signals comprises developing a set of voltage command signals related to each of the set of transformers.

8. The method of claim 7, further comprising:
   creating an additional voltage command signal by combining the set of developed voltage command signals; and
   making available the additional voltage command signal to the modulator.

9. The method of claim 8, wherein the creating an additional voltage command signal comprises:
   summing the set of developed voltage command signals, thereby creating a summed voltage command signal; and
   inverting the sign of the summed voltage command signal, thereby creating the additional voltage command signal.

10. The method of claim 1, wherein a set of the plurality of transformers is associated with a grid, wherein:
    the determining the reference flux value comprises combining the actual flux values for each of the set of transformers; and
    the measuring the actual flux value comprises measuring the actual flux value for each of the set of transformers; and
    the developing the plurality of voltage command signals comprises developing a set of voltage command signals related to each of the set of transformers.

11. A control system to balance transformer flux among a plurality of transformers connected to a plurality of converters, comprising:
    a flux estimator configured to estimate a reference flux value;
    a plurality of flux monitors in signal communication with each transformer, each flux monitor configured to measure an actual flux value of each transformer;
    a plurality of flux comparators in signal communication with the flux estimator and each flux monitor, the plurality of flux comparators configured to determine a plurality of variance values between the reference flux value and each actual flux value;
    a plurality of flux regulators in signal communication with each of the flux comparators, the plurality of flux regulators configured to develop a plurality of voltage command signals responsive to each variance value; and
    a modulator in signal communication with the plurality of flux regulators and the plurality of converters, the modulator responsive to each voltage command signal and configured to generate and make available a switching signal to each converter;
    wherein the switching signal is configured to reduce each variance value.

12. The system of claim 11, wherein:
    a set of the plurality of transformers are series connected.

13. The system of claim 11, wherein:
    the transformers are three phase transformers.

14. The system of claim 11, wherein:

the flux estimator is configured to provide an instantaneous, real-time reference flux value.

15. The system of claim 11, further comprising:

at least one current regulator in signal communication with the modulator;

wherein the at least one current regulator is configured to generate a voltage command signal responsive to current flow in the system.

16. The system of claim 11, wherein:

the modulator is a multi-pulse modulator.

17. The system of claim 11, wherein:

the modulator is a pulse width modulator.

18. The system of claim 11, wherein a set of the plurality of transformers is associated with a permanent magnet motor, wherein:

the flux estimator is configured estimate the reference flux value by relating an estimated flux value for the permanent magnet motor with the number of converters;

a set of the plurality of flux monitors is configured to measure the actual flux value of each of the set of transformers;

a set of the plurality of flux comparators is configured to determine a set of variance values between the reference flux value and each actual flux value of each of the set of transformers; and a set of the plurality of flux regulators is configured to develop a set of voltage command signals responsive to each variance value associated with each of the set of transformers.

19. The system of claim 18, further comprising:

a voltage command signal generator in signal communication with the set of flux regulators and the modulator, the voltage command signal generator configured to create an additional voltage command signal in response to the voltage command signals developed by the set of flux regulators.

20. The system of claim 19, wherein:

the voltage command signal generator is configured to create the additional voltage command signal equal to the inverse of the sum of the voltage command signals developed by the set of flux regulators.

21. The system of claim 11, wherein a set of the plurality of transformers is associated with a grid wherein:

a set of the plurality of flux monitors is configured to measure the actual flux value of each the set of transformers;

the flux estimator is configured to estimate the reference flux value as an average of the actual flux values measured by each of the set of flux monitors;

a set of the plurality of flux comparators is configured to determine a set of variance values between the reference flux value and each actual flux value of each of the set of transformers; and a set of the plurality of flux regulators is configured to develop a set of voltage command signals responsive to each variance values associated with each of the set of transformers.

\* \* \* \* \*